(12) United States Patent
Xie

(10) Patent No.: US 11,409,750 B2
(45) Date of Patent: *Aug. 9, 2022

(54) INFORMATION SEARCH METHOD AND SERVER

(71) Applicant: TENCENT TECHNOLOGY (SHENZHEN) COMPANY LIMITED, Shenzhen (CN)

(72) Inventor: Piaorui Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 249 days.

This patent is subject to a terminal disclaimer.

(21) Appl. No.: 16/218,012

(22) Filed: Dec. 12, 2018

(65) Prior Publication Data
US 2019/0114297 A1    Apr. 18, 2019

Related U.S. Application Data

(63) Continuation of application No. 14/561,536, filed on Dec. 5, 2014, now Pat. No. 10,185,749, which is a (Continued)

(30) Foreign Application Priority Data

Jun. 5, 2012  (CN) .......................... 201210182886.7

(51) Int. Cl.
*G06F 16/2457*  (2019.01)
*G06F 16/951*   (2019.01)
*G06F 16/9535*  (2019.01)

(52) U.S. Cl.
CPC ...... *G06F 16/24578* (2019.01); *G06F 16/951* (2019.01); *G06F 16/9535* (2019.01)

(58) Field of Classification Search
CPC .......... G06F 16/9535; G06F 16/24578; G06F 16/24575; G06F 16/9024; G06F 16/951;
(Continued)

(56) References Cited

U.S. PATENT DOCUMENTS 7,716,199 B2 * 5/2010 Guha .................. G06F 16/9535
                                                              707/706
7,823,064 B1    10/2010 Levy
(Continued)

FOREIGN PATENT DOCUMENTS

CN       1418344       5/2003
CN       101916274    12/2010
(Continued)

OTHER PUBLICATIONS

Teevan et al.; 2011. #TwitterSearch: a comparison of microblog search and web search. In Proceedings of the fourth ACM international conference on Web search and data mining (WSDM '11). Association for Computing Machinery, New York, NY, USA, p. 35-44. (Year: 2011).*

(Continued)

*Primary Examiner* — Dennis Truong
(74) *Attorney, Agent, or Firm* — Arentfox Schiff LLP

(57) ABSTRACT

A method, information processing apparatus, and a non-transitory computer-readable medium are provided. A search request including a keyword is received from a terminal of a user. A search is performed for a plurality of common webpage entries according to the keyword. A search is performed for a plurality of friend webpage entries of friends according to the keyword. Page scores for the plurality of common webpage entries and the plurality of friend webpage entries are determined based on the keyword. The page scores of only the plurality of friend webpage entries are weighted according to a first weighting (Continued)

factor. A combined list of webpage entries is generated based on the page scores for the plurality of common webpage entries and the weighted page scores for the plurality of friend webpage entries. The combined list includes a first subset of the plurality of common webpage entries and a second subset of the plurality of friend webpage entries. The generated combined list of webpage entries is sent to the terminal.

18 Claims, 4 Drawing Sheets

Related U.S. Application Data continuation of application No. PCT/CN2013/076410, filed on May 29, 2013.

(58) Field of Classification Search
CPC ............ G06F 16/2455; G06F 16/2457; G06F 16/248; G06F 16/332; G06F 16/338; G06F 16/43; G06F 16/735; G06F 16/738; G06F 16/7867; G06F 16/90335; G06F 16/95; G06Q 50/01; G06Q 30/0255; G06Q 30/0269
See application file for complete search history.

(56) References Cited

U.S. PATENT DOCUMENTS

| | | | |
|---|---|---|---|
| 8,572,129 B1* | 10/2013 | Lee .................. | G06F 16/95 707/798 |
| 8,959,083 B1* | 2/2015 | Gyongyi .......... | G06F 16/24578 707/723 |
| 9,223,849 B1* | 12/2015 | Bilinski ............ | G06F 16/284 |
| 9,271,023 B2* | 2/2016 | Ramer .............. | H04N 21/2407 |
| 2005/0010863 A1* | 1/2005 | Zernik ............... | G06F 40/194 715/229 |
| 2006/0064411 A1* | 3/2006 | Gross ................ | G06F 16/90324 |
| 2008/0147722 A1* | 6/2008 | Dolin ................ | G06F 16/9535 |
| 2008/0148147 A1* | 6/2008 | Poston ............... | G06F 16/34 715/273 |
| 2008/0263032 A1* | 10/2008 | Vailaya ............. | G06F 16/334 |
| 2010/0131489 A1 | 5/2010 | Goldman-Shenhar et al. | |
| 2010/0174709 A1* | 7/2010 | Hansen ............. | G06F 16/9537 707/728 |
| 2010/0318551 A1* | 12/2010 | Lai .................... | G06F 16/9535 707/765 |
| 2011/0022602 A1* | 1/2011 | Luo .................. | G06F 16/24578 707/748 |
| 2011/0035329 A1* | 2/2011 | Delli Santi ........ | H04L 67/22 705/347 |
| 2011/0264648 A1* | 10/2011 | Gulik ................ | G06F 16/9535 707/722 |
| 2012/0078870 A1* | 3/2012 | Bazaz ............... | G06F 16/583 707/706 |
| 2012/0078916 A1* | 3/2012 | Tseng ............... | G06F 16/29 707/748 |
| 2012/0158715 A1* | 6/2012 | Maghoul ........... | G06F 16/951 707/728 |
| 2012/0158720 A1* | 6/2012 | Luan ................. | G06Q 50/01 707/732 |
| 2013/0036109 A1* | 2/2013 | Kulick .............. | G06Q 10/10 707/722 |
| 2013/0066710 A1* | 3/2013 | Zimak .............. | G06Q 30/0241 705/14.43 |
| 2013/0124538 A1* | 5/2013 | Lee .................. | H04L 63/105 707/749 |
| 2013/0191372 A1* | 7/2013 | Lee .................. | G06F 16/9535 707/722 |
| 2013/0191416 A1* | 7/2013 | Lee .................. | G06F 16/2457 707/771 |
| 2013/0246405 A1* | 9/2013 | Annau ............... | G06F 16/951 707/723 |
| 2014/0289216 A1* | 9/2014 | Voellmer .......... | G06F 16/248 707/708 |
| 2015/0154202 A1* | 6/2015 | Lunt ................. | G06F 16/24578 707/723 |
| 2015/0261806 A1* | 9/2015 | Sanchez ........... | G06Q 30/0226 707/722 |

FOREIGN PATENT DOCUMENTS

| | | |
|---|---|---|
| JP | 2010503081 | 1/2010 |
| JP | 2010140411 | 6/2010 |
| JP | 2013527959 | 7/2013 |
| JP | 2014528113 | 10/2014 |
| WO | 2011133716 | 10/2011 |

OTHER PUBLICATIONS

International Search Report for Application No. PCT/CN2013/076410 dated Aug. 15, 2013 (w/English translation).
Japanese Office Action for Application No. 2015-515378 dated Oct. 20, 2015 (w/English translation).
International Preliminary Report for Application No. PCT/CN2013/076410 dated Dec. 18, 2014.
European Search Report for European Application No. EP13800293, dated Apr. 8, 2016.

* cited by examiner

Invention

China invention website - China invention website
............

'I love invention' official website
............

Invention-soso Encyclopedia
............

Invention patent|invention innovation-'Look at this website' invention patent channel
............

Beijing invention association
............

FIG. 2

Promotion in Shenzhen

Information of my QQ friend: Xielin
    QQ microblog:
    Today, I got my household finally. My promotion in Shenzhen is all finished now!
    2012-08-09
    QQ zone:
    Blog: Procedure about my promotion in Shenzhen 2010-08-19

Information of my QQ friend: Feixiang
    QQ zone:
    Blog: Requirements and tips for promotion in Shenzhen this year 2010-05-20

Real procedure about promotion and residence registration (personal, not agency, not ad) Shenzhen Tianya community
    The residence page was got on July 1st, and the second version ID card was got on August 5$^{th}$...................
Bbs.city.tianya.cn...2010-8-20

FIG. 4

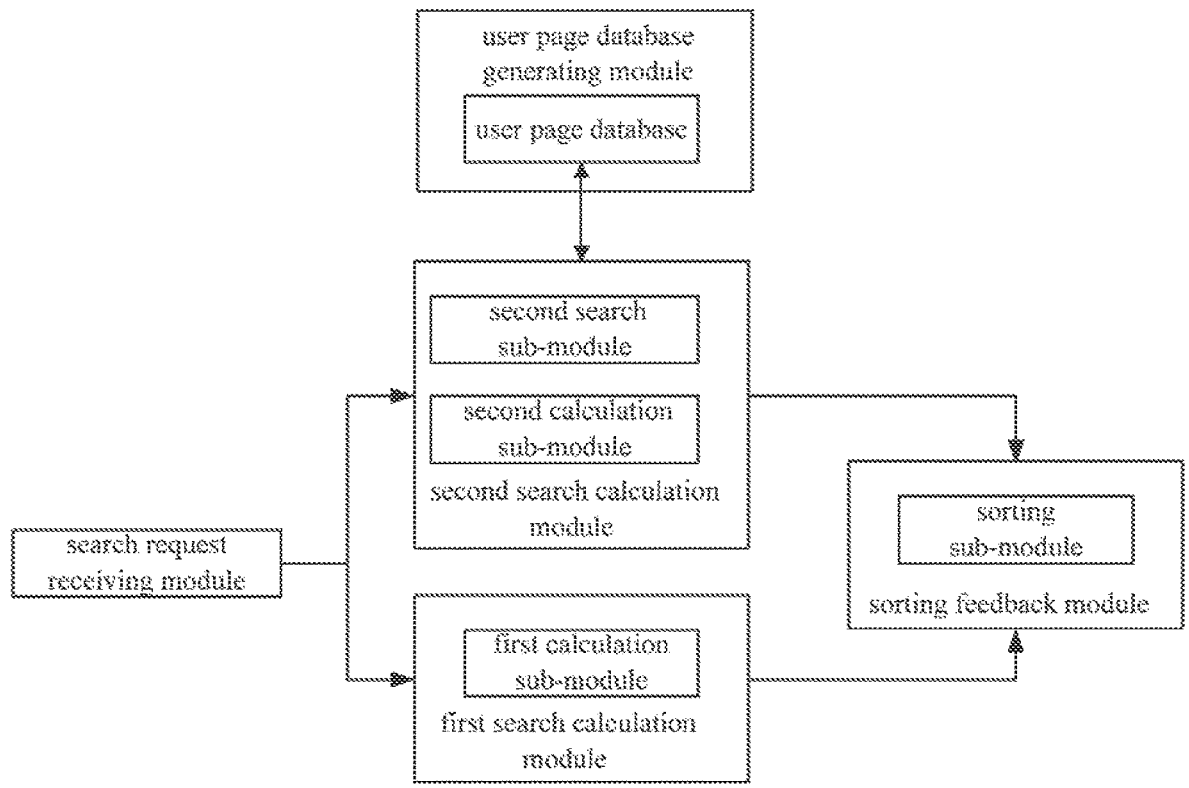

FIG. 5

INFORMATION SEARCH METHOD AND SERVER

CROSS-REFERENCE TO RELATED APPLICATIONS

This application is a continuation application of and is based upon and claims the benefit of priority under 35 U.S.C. § 120 from, U.S. application Ser. No. 14/561,536, filed Dec. 5, 2014, which is a National Stage Application of International Application No. PCT/CN2013/076410 filed on May 29, 2013. This application also incorporates by reference the entire contents of Chinese Patent Application No. 201210182886.7, filed Jun. 5, 2012. The entire disclosures of each of the above applications are incorporated herein by reference.

FIELD

The present disclosure relates to a method and server for searching for information.

BACKGROUND

This section provides background information related to the present disclosure which is not necessarily prior art.

The method for searching for information in the prior art includes the following steps:
a user terminal receives a keyword input by a user and sends a search request including the keyword to a network-side server; the server searches the full amount inverse database according to the keyword for webpage entries, calculates a page score for each of the webpage entries; sorts the searched webpage entries in descending order according to the page scores; and feeds back the sorted webpage entries to the user terminal. Afterwards, the user terminal displays the sorted webpage entries to the user, with each webpage entry corresponding to a webpage. When the user clicks a webpage entry, the corresponding webpage is then displayed.

The method for calculating a page score includes calculating an original page score and a page factor of a webpage entry, multiplying the original page score by the page factor to obtain a multiplier, and using the multiplier as the page score of the corresponding webpage entry.

The original page score is mainly to indicate the degree of importance of the keyword in the page. Currently, there are several ways to calculate the original page score. In an example, an Inverse Document Frequency (IDF) is used for calculation. For example, given the keyword of "invention", the frequency of "invention" present in a certain page is regarded as the original score of the page. The frequency of the keyword present in the page can be calculated by an IDF equation.

The page factor used for calculating the page score includes at least one factor, for example, a reference value. The reference value is specified as the probability of a certain page referenced by other pages. FIG. 1 illustrates an exemplary reference (link) relationship between pages according to the prior art, in which page A is referenced by page B and page C, and D is referenced by page A; thus, when sorting the reference values of page A, page B, page C, and page D, the result is:
page A>page D>page B=page C.

Assuming the keyword is "invention", FIG. 2 illustrates some webpage entries displayed by the user terminal after searching, including a webpage entry about "China invention website", a webpage entry about "'I love invention' official website", a webpage entry about "invention-SoSo Encyclopedia", a webpage entry about "invention patent|invention innovation-'Look at this website' invention patent channel", and a webpage entry about "Beijing invention association". The " . . . " in FIG. 2 stands for the overview of each webpage entry.

Existing search engine tools provide a function of logging on the search platform using a user identification. The user may use the log-on status for searching for information. In practical application, the operator providing the search engine service may also provide other services, which all include a page to facilitate the user to deliver contents. In addition to the search engine service, a user may use other services by the same user identification, deliver contents in those services, and upload webpage data to the server. Each user may have a plurality of friends. When searching for information, the user often hopes to search for webpage data uploaded by friends in other services according to the input keyword.

For example, services provided by a Tencent operator include SoSo search engine service, QQ zone service, Tencent microblog service, Tencent shuoshuo service, etc. In addition to the SoSo search engine service, a same user may use other services by the same user identification, and may also upload webpage data to the server in other services. For example, in QQ zone service, the user uploads webpage data regarding personal blogs to the QQ zone server; or, in the Tencent microblog service, the user uploads webpage data regarding microblog information to the Tencent microblog server. Specifically, the above-described user identification may be a QQ account. When user A searches by the SoSo search engine of Tencent (the search website is www.soso.com) and inputs a keyword of "invention", it would be better to meet the search requirements of the user if the SoSo search engine can provide the webpage entries about "invention" uploaded by friends of user A in other services.

SUMMARY

This section provides a general summary of the disclosure, and is not a comprehensive disclosure of its full scope or all of its features.

Various embodiments of the present disclosure provide a method for searching for information. The method can display the friend webpage entry in the search result and configure the search result to better meet the search requirements of the user.

Various embodiments of the present disclosure provide a server for searching for information. The server can display the friend webpage entry in the search result and configure the search result to better meet the search requirements of the user.

An embodiment of the present disclosure provides a method for searching for information, comprising of the following:
obtaining page information of network services of users and storing the page information in a user page database;
receiving a search request including a keyword from a search user;
searching a full amount inverse database for a common webpage entry according to the keyword, and obtaining a page score of the common webpage entry;
searching the user page database for a friend webpage entry of all friends of the search user according to the keyword, and obtaining a page score of the friend webpage entry; and sorting the common webpage entry searched out and the friend webpage entry searched out in descending order according to the page scores, and feeding back the sorted webpage entries to the search user.

Another embodiment of the present disclosure provides a server for searching for information, comprising a user page database generating module, a search request receiving module, a first search calculation module, a second search calculation module, and a sorting feedback module, wherein the user page database generating module is configured to obtain page information of network services of users, and store the page information in a user page database;

the search request receiving module is configured to receive a search request including a keyword from a search user, and send the search request to the first search calculation module and the second search calculation module;

the first search calculation module is configured to search a full amount inverse database for a common webpage entry according to the keyword, obtain a page score of the common webpage entry, and send the common webpage entry and the page score to the sorting feedback module;

the second search calculation module is configured to search the user page database for a friend webpage entry of all friends of the search user according to the keyword, obtain a page score of the friend webpage entry, and send the friend webpage entry and the page score to the sorting feedback module; and the sorting feedback module is configured to sort the common webpage entry searched out and the friend webpage entry searched out in descending order according to the page scores, and the sorted webpage entries are returned to the search user.

Another embodiment of the present disclosure provides a method for searching for information, comprising:
obtaining page information of network services of users, and storing the page information in a user page database;
receiving a search request including a keyword from a search user;
searching for a common webpage entry according to the keyword, and searching the user page database for a friend webpage entry of all friends of the search user according to the keyword; and
sorting the common webpage entry searched out and the friend webpage entry searched out, and feeding back the sorted webpage entries to the search user.

Another embodiment of the present disclosure provides a storage medium, configured to store computer-executable instructions, wherein the computer-executable instructions are configured to control a server to execute a method for searching for information, the method comprising:
obtaining page information of network services of users, and storing the page information in a user page database;
receiving a search request including a keyword from a search user;
searching a full amount inverse database for a common webpage entry according to the keyword, and obtaining a page score of the common webpage entry;
searching the user page database for a friend webpage entry of all friends of the search user according to the keyword, and obtaining a page score of the friend webpage entry; and
sorting the common webpage entry searched out and the friend webpage entry searched out in descending order according to the page scores, and feeding back the sorted webpage entries to the search user.

It can be seen from the above embodiments thatpage information of all the network services of all the users is obtained in advance, and stored in a user page database. When requiring to search for information, a common webpage entry is searched in a full amount inverse database according to the keyword included in the search request, and a page score of the common webpage entry is calculated. A friend webpage entry of all the friends of the search user is searched in the user page database according to a keyword, and a page score of the friend webpage entry is calculated. The common webpage entry searched out and the friend webpage entry searched out are then sorted in descending order according to the page scores, and the sorted webpage entries are fed back to the user terminal. Accordingly, the friend webpage entry can be present in the search result and the search result is able to better meet the search requirements of the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a diagram illustrating webpage entries displayed by a user terminal to a user in the prior art.

FIG. 4 is a diagram illustrating search result entries searched according to a keyword "promotion in Shenzhen" according to an various embodiments of the present disclosure.

FIG. 5 is a diagram illustrating a structure of a server for searching for information according to various embodiments of the present disclosure.

Corresponding reference numerals indicate corresponding parts throughout the several views of the drawings.

DETAILED DESCRIPTION

The various embodiments will now be described more fully with reference to the accompanying drawings.

In order to make the object, technical solution and merits of the present disclosure clearer, the present disclosure will be illustrated in detail hereinafter with reference to the accompanying drawings and specific examples.

Figure 1:
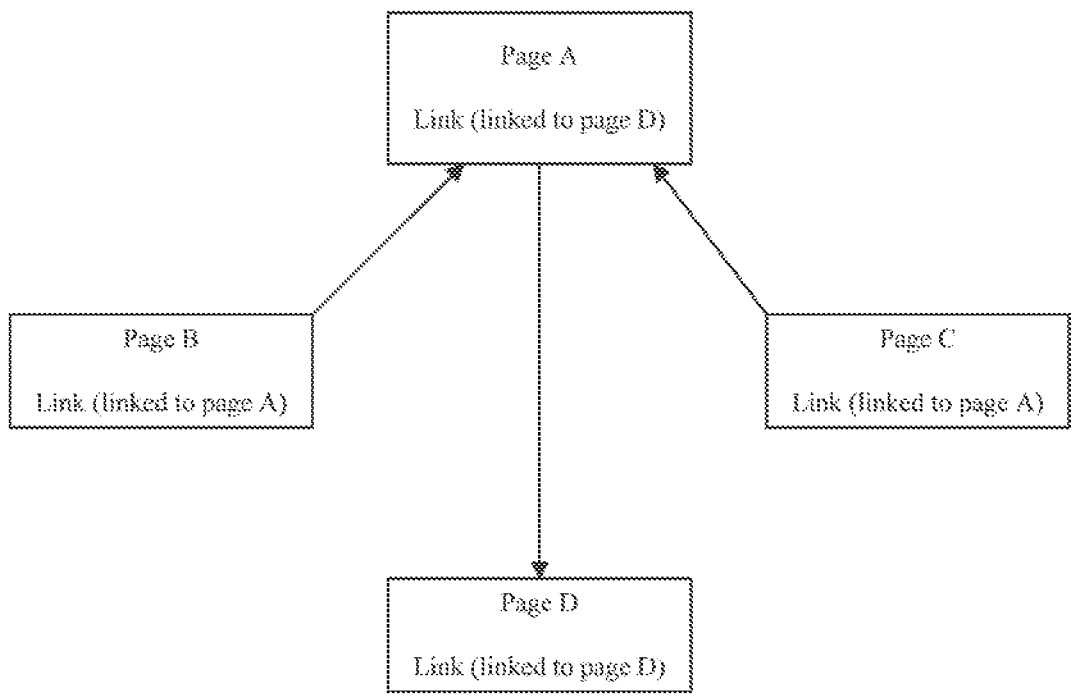
FIG. 1 is a diagram illustrating a reference relationship between pages in the prior art.
Figure 3:
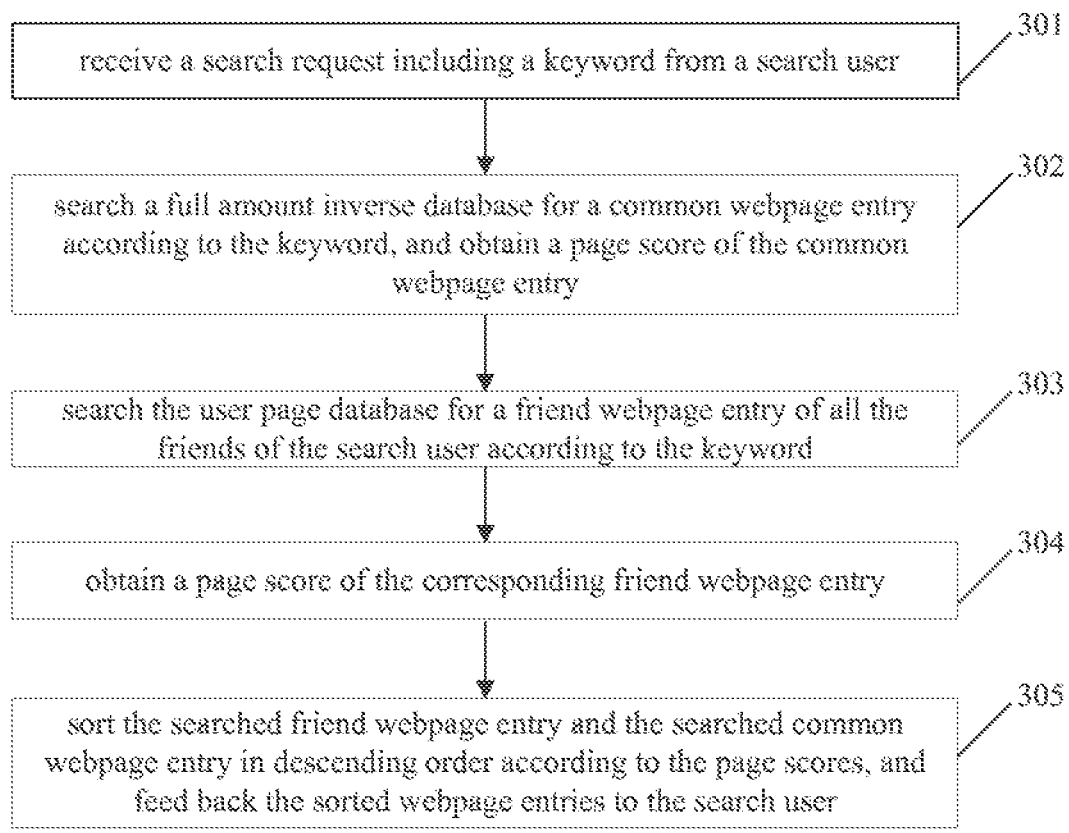
FIG. 3 is a flow diagram illustrating a method for searching for information according to various embodiments of the present disclosure.

In various embodiments of the present disclosure, page information of all the network services of all the users is obtained in advance, and the page information in a user page database is stored. Preferably, the network services are provided by a same network service provider. When it is required, the user page database for a friend webpage entry of all the friends of the search user is searched according to a keyword, the friend webpage entry and a common webpage entry searched in a full amount inverse database is sorted as a whole, and the sorted webpage entries to the user terminal are returned. Accordingly, the friend webpage entry can be present in the search result. FIG. 3 is a diagram illustrating a method for searching for information according to various embodiments of the present disclosure. In the method, page data generated by all the users under each service provided by a single operator is obtained in advance and stored in the user page database.

The operator providing the search engine service may also provide other services, which all include a page to facilitate the user to deliver contents. In addition to the search engine service, a user may use other services by a same user identification, deliver contents in those services, and upload webpage data to the server.

For example, services provided by Tencent operator include a SoSo search engine service, a QQ zone service, a Tencent microblog service, a Tencent shuoshuo service, etc. In addition to the SoSo search engine service, the same user may use other services by the same user identification, and may also upload the webpage data to the server, such as the webpage data of the address information of friends and the webpage data of the contacts information of friends. For example, in QQ zone service, the webpage data about personal log to the QQ zone server is uploaded; or, in Tencent microblog service, the webpage data about microblog information is uploaded to the Tencent microblog server.

For example, services provided by Tencent operator include SoSo search engine service, QQ zone service, Tencent microblog service, Tencent shuoshuo service, etc. In addition to SoSo search engine service, a same user may use other services by the same user identification, deliver contents in other services, and upload webpage data to the server, such as webpage data about address information of friends, and webpage data about contacts information of friends. For example, in QQ zone service, the user uploads webpage data about personal blogs to the QQ zone server; or, in Tencent microblog service, the user uploads webpage data about microblog information to the Tencent microblog server.

In the various embodiments, page data generated by users is obtained in advance from service servers corresponding to other services, and the page data is stored in the user page database according to the user identification. The present disclosure is applied for the log-on users to search for information. FIG. 3 includes the following procedures.

Block 301: receive a search request including a keyword from a search user.

A user terminal receives a keyword input by the user, and sends a search request including the keyword to a network-side server.

Block 302: search a full amount inverse database for a common webpage entry according to the keyword, and obtain a page score of the common webpage entry.

In the various embodiments, a webpage entry searched in the full amount inverse database is referred to as the common webpage entry.

The method for calculating a page score includes calculating an original page score and a page factor of a webpage entry, multiplying the original page score by the page factor to obtain a multiplier, and using the multiplier as the page score of the corresponding webpage entry.

The original page score is mainly to indicate the degree of importance of the keyword in the page. Currently, there are several ways to calculate the original page score. In an example, the IDF is used for calculation. For example, given the keyword of "invention", the frequency of "invention" present in a certain page is regarded as the original score of the page. The frequency of the keyword present in the page can be calculated by an IDF equation. The page factor used for calculating the page score includes at least one factor, for example, a reference value.

Block 303: search the user page database for a friend webpage entry of all the friends of the search user according to the keyword.

The server providing a search engine includes a friend database, where the user-friend relationship is stored. Identifiers of all the friends can be found in the friend database according to the user name. Specifically, Block 303 includes the following:

obtaining identifiers of all the friends of the search user from the friend database;

finding friend webpage entries corresponding to the identifiers of all the friends in the user page database;

searching for a required friend webpage entry according to the keyword from the found friend webpage entries.

Block 304: obtain a page score of the corresponding friend webpage entry.

The page score of the friend webpage entry is determined according to a friend factor and an original page score. In particular, the page score of the corresponding friend webpage entry can be determined by multiplying the friend factor by the original page score.

The above-described friend factor may be a predetermined value or a multiplier of a predetermined value by a user intimacy. The user intimacy is frequency of information transmission between the search user and a friend corresponding to the friend webpage entry. The user intimacy may be a constant between 1 and N, in which N is a natural number. The user intimacy may be determined by information amount communicated between two friends. The calculation of user intimacy may use the existing methods, which is not described in detail herein.

Block 303 can be performed before Block 302.

Block 305: sort the friend webpage entry searched out and the common webpage entry searched out in descending order according to the page scores, and return the sorted webpage entries to the search user.

The predetermined value mentioned in Block 304 may be set based on needs, for example, Lg(100), i.e., 2. In order to enable the friend webpage entries ranked on the top, the predetermined value may be increased to enhance the page scores of the friend webpage entries so as to prioritize the friend webpage entries.

In particular, Block 305 includes the following:

sorting the common webpage entries searched out in descending order according to the page scores and selecting the first P common webpage entries after sorting;

sorting the friend webpage entries searched out in descending order according to the page scores and selecting the first Q friend webpage entries after sorting;

sorting the selected P common webpage entries and the selected Q friend webpage entries in descending order according to the page scores, where P and Q are natural numbers, for example, P is 1000, and Q is 100.

There may be the same webpage entry included in both the selected P common webpage entries and the selected Q friend webpage entries. It is necessary to retain one and delete the other. Accordingly, after selecting P common webpage entries and Q friend webpage entries, Block 305 includes the following: deleting a webpage entry which is included in both the first P common webpage entries and the first Q friend webpage entries and sorting the remained common webpage entries and the remained friend webpage entries in descending order according to the page scores. In an example, a webpage entry which is included in both the first P common webpage entries and the first Q friend webpage entries may be deleted from the first P common webpage entries, and then sort the friend webpage entries and the remaining common webpage entries. For example, it may arrange the friend webpage entries before the remained common webpage entries, or sort the friend webpage entries and the remaining common webpage entries in descending order according to the page scores, or arrange the friend webpage entries before the remaining common webpage entries and sort the friend webpage entries in descending order according to the page scores.

FIG. 4 is a diagram illustrating search result entries searched according to the keyword "promotion in Shenzhen" according to various embodiments of the present disclosure. In FIG. 4, some searched webpage entries are shown, including friend webpage entries from the user page database, a webpage entry including words "promotion in Shenzhen" presented by QQ friend "Xielin" in QQ microblog and QQ zone, a webpage entry including words "promotion in Shenzhen" presented by QQ friend "Feixiang" in QQ zone, and a common webpage entry from the full amount inverse database, i.e., a webpage entry regarding "promotion in Shenzhen" presented in Tianya community.

In the present disclosure, a user page database in advance for storing page data generated by users under each service provided by the same operator is established. When required, the user page database for a friend webpage entry of all the friends of the search user according to a keyword is searched, a page score of the corresponding friend webpage entry is obtained, the friend webpage entry and the common webpage entry searched in the full amount inverse database is sorted as a whole, and the sorted webpage entries are returned to the user terminal. Accordingly, the friend webpage entry can be present in the search result and configure the search result to better meet the search requirements of the user.

Furthermore, it may increase the friend factor when needed to enhance the page scores of the friend webpage entries, in order to enable the friend webpage entries ranked on the top and prioritize the friend webpage entries. In an example, it may arrange the friend webpage entries before the common webpage entries, and delete a webpage entry which is included in both the common webpage entries and the friend webpage entries from the common webpage entries.

FIG. 5 is a diagram illustrating a structure of a server for searching for information according to various embodiments of the present disclosure. The server includes a user page database generating module, a search request receiving module, a first search calculation module, a second search calculation module, and a sorting feedback module.

The user page database generating module is configured to obtain page information of all the network services of users and store the page information in a user page database.

The search request receiving module is configured to receive a search request including a keyword from a search user and send the search request to the first search calculation module and the second search calculation module.

The first search calculation module is configured to search a full amount inverse database for a common webpage entry according to the keyword, obtain a page score of the common webpage entry, and send the common webpage entry and the page score to the sorting feedback module.

The second search calculation module is configured to search the user page database for a friend webpage entry of all the friends of the search user according to the keyword, obtain a page score of the friend webpage entry, and send the friend webpage entry and the page score to the sorting feedback module.

The sorting feedback module is configured to sort the friend webpage entry searched out and the common webpage entry searched out in descending order according to the page scores, and return the sorted webpage entries to the search user.

In various embodiments, the second search calculation module includes a second search sub-module, configured to obtain identifiers of all the friends of the search user from the friend database; find friend webpage entries corresponding to identifiers of all the friends in the user page database; and search for a required friend webpage entry according to the keyword from the found friend webpage entries.

In various embodiments, the second search calculation module includes a second calculation sub-module, configured to determine a page score of the friend webpage entry according to a friend factor and an original page score. The friend factor may be a predetermined value or a multiplier of a predetermined value by a user intimacy. The user intimacy is the frequency of information transmission between the search user and a friend corresponding to the friend webpage entry.

In various embodiments, the first search calculation module includes a first calculation sub-module configured to calculate an original page score and a friend factor of the common webpage entry, multiplying the original page score by the friend factor to obtain a multiplier, and using the multiplier as the page score of the common webpage entry.

In various embodiments, the sorting feedback module includes a sorting sub-module configured to sort the common webpage entries searched out in descending order according to the page scores, and select the first P common webpage entries after sorting; sort the friend webpage entries searched out in descending order according to the page scores, and select the first Q friend webpage entries after sorting; delete a webpage entry which is included in both the first P common webpage entries and the first Q friend webpage entries, and sort the remained common webpage entries and the remained friend webpage entries in descending order according to the page scores, where P and Q are natural numbers.

The methods and devices provided by various embodiments of the present disclosure may be achieved by hardware, machine-readable instructions, or a combination of hardware and machine-readable instructions. The machine-readable instructions used in the present disclosure may be stored by multiple processors in a readable storage medium, such as a hard disk, a Compact Disc Read-Only Memory (CD-ROM), a Digital Video Disk (DVD), a compact disk, a floppy disk, a magnetic disk, a Random Access Memory (RAM), ROM and other suitable storage devices. Or, part of the machine-readable instructions may be achieved by specific hardware, such as custom integrated circuits, gate arrays, Field Programmable Gate Array (FPGA), Programmable Logic Device (PLD), a computer with specific functions, etc.

Various embodiments of the present disclosure also provide a computer readable storage medium configured to store instructions for a computer to execute the method described in the present disclosure. Specifically, the system and device provided by various embodiments of the present disclosure all include a storage medium, which stores machine-readable program codes for achieving functions of any one of the above-mentioned examples. The system and device (or Central Processing Unit (CPU) or Microprocessor Unit (MPU)) may read and execute program codes stored in the storage medium.

In this case, the program codes read from the storage medium can achieve any one of the above-mentioned examples. Therefore, the program codes and the storage medium storing the program codes are parts of technical solutions of the present disclosure.

The storage medium for providing program codes includes a floppy disk, a hard disk, a magnetic optical disk, a compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

It should be noted that, for the program codes being executed by a computer, at least a part of operations achieved by the program codes may be implemented by an operating system running on a computer, so as to achieve technical solutions of any one of examples as mentioned above. The computer executes instructions based on the program codes.

In addition, the program codes in the storage medium are written in a memory, and the memory is located in an extended board inside a computer, or in an extended unit connected with a computer. In the example, a CPU on the extended board or the extended unit executes at least a part of operations based on the program codes according to instructions, so as to implement technical solutions of any one of the aforementioned examples.

The foregoing is preferred examples of the present disclosure, which is not used for limiting the protection scope of the present disclosure. Any modifications, equivalent substitutions and improvements made within the spirit and principle of the present disclosure, should be covered by the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A searching method, comprising:
    generating, by an operator of plural network user services, a user page database including webpage entries of users of the plural network user services;
    receiving a search request through a search service of the operator, the search request including a keyword from a terminal of a user;
    searching, using the search service of the operator, for a plurality of common webpage entries according to the keyword;
    searching, in the generated user page database, for a plurality of friend webpage entries of friends of the user in two or more of the plural network user services of the operator according to the keyword;
    determining a page score for each webpage entry of the plurality of common webpage entries and the plurality of friend webpage entries, the page scores indicating a degree of importance of the keyword in the respective common webpage entry or the respective friend webpage entry;
    weighting the page scores of only the plurality of friend webpage entries by multiplying the page scores of only the plurality of friend webpage entries by a friend factor;
    generating, by processing circuitry of an information processing apparatus, a combined list of webpage entries that includes a first subset of the plurality of common webpage entries and a second subset of the plurality of friend webpage entries based on the page scores for the plurality of common webpage entries and the weighted page scores for the plurality of friend webpage entries, wherein the combined list of webpage entries is sorted based the page scores, wherein the combined list includes a combined entry showing plural friend webpage entries posted by a first friend on different ones of the plural network user services of the operator, and the combined entry is identified with a name of the first friend,
    wherein when the combined list of webpage entries includes a duplicate webpage entry that is included in both the first subset of the plurality of common webpage entries and the second subset of the plurality of friend webpage entries, including the duplicate webpage entry from only the second subset of the plurality of friend webpage entries in the combined list of webpage entries such that the duplicate webpage entry is presented earlier in the combined list of webpage entries; and
    sending the generated combined list of webpage entries to the terminal.

2. The method according to claim 1, wherein a number of the first subset of the plurality of common webpage entries is greater than a number of the second subset of the plurality of friend webpage entries.

3. The method according to claim 2, wherein
    the number of the first subset of the plurality of common webpage entries and the number of the second subset of the plurality of friend webpage entries are predetermined for a plurality of different searches.

4. The method according to claim 1, wherein the weighting the page scores comprises:
    multiplying the page scores of only the plurality of friend webpage entries by the friend factor, which is a product of a first weighting factor and a second weighting factor, the first weighting factor being the same for each of the plurality of friend webpage entries, and the second weight factor being determined based on a frequency of communication between the user and a friend associated with each of the plurality of friend webpage entries.

5. The method according to claim 1, wherein the friend factor is greater than 1.

6. The method according to claim 1, wherein the combined list of webpage entries is sorted in decreasing order of the page scores of the first subset of the plurality of common webpage entries and the second subset of the plurality of friend webpage entries.

7. An information processing apparatus of an operator, comprising:
communication circuitry configured to receive, through a search service of the operator, a search request including a keyword from a terminal of a user; and
processing circuitry configured to
generate a user page database including webpage entries of users of plural network user services of the operator;
search, using the search service of the operator, for a plurality of common webpage entries according to the keyword;
search, in the generated user page database, for a plurality of friend webpage entries of friends of the user in two or more of the plural network user services of the operator according to the keyword;
determine a page score for each webpage entry of the plurality of common webpage entries and the plurality of friend webpage entries, the page scores indicating a degree of importance of the keyword in the respective common webpage entry or the respective friend webpage entry;
weight the page scores of only the plurality of friend webpage entries by multiplying the page scores of only the plurality of friend webpage entries by a friend factor;
generate a combined list of webpage entries that includes a first subset of the plurality of common webpage entries and a second subset of the plurality of friend webpage entries based on the page scores for the plurality of common webpage entries and the weighted page scores for the plurality of friend webpage entries, wherein the combined list of webpage entries is sorted based the page scores, wherein the combined list includes a combined entry showing plural friend webpage entries posted by a first friend on different ones of the plural network user services of the operator, and the combined entry is identified with a name of the first friend,
wherein when the combined list of webpage entries includes a duplicate webpage entry that is included in both the first subset of the plurality of common webpage entries and the second subset of the plurality of friend webpage entries, include the duplicate webpage entry from only the second subset of the plurality of friend webpage entries in the combined list of webpage entries such that the duplicate webpage entry is presented earlier in the combined list of webpage entries; and
send, via the communication circuitry, the generated combined list of webpage entries to the terminal.

8. The information processing apparatus according to claim 7, wherein a number of the first subset of the plurality of common webpage entries is greater than a number of the second subset of the plurality of friend webpage entries.

9. The information processing apparatus according to claim 8, wherein
the number of the first subset of the plurality of common webpage entries and the number of the second subset of the plurality of friend webpage entries are predetermined for a plurality of different searches.

10. The information processing apparatus according to claim 7, wherein the processing circuitry is configured to multiply the page scores of only the plurality of friend webpage entries by the friend factor, which is a product of a first weighting factor and a second weighting factor, the first weighting factor being the same for each of the plurality of friend webpage entries, and the second weight factor being determined based on a frequency of communication between the user and a friend associated with each of the plurality of friend webpage entries.

11. The information processing apparatus according to claim 7, wherein the friend factor is greater than 1.

12. The information processing apparatus according to claim 7, wherein the combined list of webpage entries is sorted in decreasing order of the page scores of the first subset of the plurality of common webpage entries and the second subset of the plurality of friend webpage entries.

13. A non-transitory computer-readable medium storing instructions which when executed by a processor cause the processor to perform a method comprising:
generating, by an operator of plural network user services, a user page database including webpage entries of users of the plural network user services;
receiving a search request through a search service of the operator, the search request including a keyword from a terminal of a user;
searching, using the search service of the operator, for a plurality of common webpage entries according to the keyword;
searching, in the generated user page database, for a plurality of friend webpage entries of friends of the user in two or more of the plural network user services of the operator according to the keyword;
determining a page score for each webpage entry of the plurality of common webpage entries and the plurality of friend webpage entries, the page scores indicating a degree of importance of the keyword in the respective common webpage entry or the respective friend webpage entry;
weighting the page scores of only the plurality of friend webpage entries by multiplying the page scores of only the plurality of friend webpage entries by a friend factor;
generating, by processing circuitry of an information processing apparatus, a combined list of webpage entries that includes a first subset of the plurality of common webpage entries and a second subset of the plurality of friend webpage entries based on the page scores for the plurality of common webpage entries and the weighted page scores for the plurality of friend webpage entries, wherein the combined list of webpage entries is sorted based the page scores, wherein the combined list includes a combined entry showing plural friend webpage entries posted by a first friend on different ones of the plural network user services of the operator, and the combined entry is identified with a name of the first friend,
wherein when the combined list of webpage entries includes a duplicate webpage entry that is included in both the first subset of the plurality of common webpage entries and the second subset of the plurality of friend webpage entries, including the duplicate webpage entry from only the second subset of the plurality of friend webpage entries in the combined list of webpage entries such that the duplicate webpage entry is presented earlier in the combined list of webpage entries; and sending the generated combined list of webpage entries to the terminal.

14. The non-transitory computer-readable medium according to claim 13, wherein a number of the first subset of the plurality of common webpage entries is greater than a number of the second subset of the plurality of friend webpage entries.

15. The non-transitory computer-readable medium according to claim 14, wherein
the number of the first subset of the plurality of common webpage entries and the number of the second subset of the plurality of friend webpage entries are predetermined for a plurality of different searches.

16. The non-transitory computer-readable medium according to claim 13, wherein the weighting the page scores comprises:
multiplying the page scores of only the plurality of friend webpage entries by the friend factor, which is a product of a first weighting factor and a second weighting factor, the first weighting factor being the same for each of the plurality of friend webpage entries, and the second weight factor being determined based on a frequency of communication between the user and a friend associated with each of the plurality of friend webpage entries.

17. The non-transitory computer-readable medium according to claim 13, wherein the friend factor is greater than 1.

18. The non-transitory computer-readable medium according to claim 13, wherein the combined list of webpage entries is sorted in decreasing order of the page scores of the first subset of the plurality of common webpage entries and the second subset of the plurality of friend webpage entries.

* * * * *